United States Patent [19]

Kronman

[11] Patent Number: 5,481,965
[45] Date of Patent: Jan. 9, 1996

[54] RACK AND SCREEN ASSEMBLY FOR CONVERTING GAS GRILLES INTO CHARCOAL AND/OR WOOD BURNING GRILLES

[75] Inventor: Leonard Kronman, Charlestown, Mass.

[73] Assignee: Natural Grilling & Fuel Systems, Inc., Charlestown, Mass.

[21] Appl. No.: 426,736

[22] Filed: Apr. 21, 1995

[51] Int. Cl.⁶ .................... A47J 37/00; A47J 37/07
[52] U.S. Cl. .................... 99/340; 99/445; 99/450; 99/482; 126/25 R; 126/41 R
[58] Field of Search .................... 99/339, 340, 357, 99/444–450, 481, 482; 126/25 R, 9 R, 39 R, 41 R, 25 A, 25 B, 39 E; 426/523

[56] References Cited

U.S. PATENT DOCUMENTS

| | | |
|---|---|---|
| 1,956,387 | 4/1934 | Hartman . |
| 3,186,331 | 6/1965 | Dettling . |
| 3,443,510 | 5/1969 | Norton . |
| 3,824,984 | 7/1974 | Swanson et al. ............. 126/25 R |
| 3,946,651 | 3/1976 | Garcia . |
| 4,140,049 | 2/1979 | Stewart ..................... 126/25 R |
| 4,508,024 | 4/1985 | Perkins ........................ 99/340 |
| 4,553,524 | 11/1985 | Wheat et al. ............... 126/41 R |
| 4,598,634 | 7/1986 | Van Horn, II . |
| 4,606,261 | 8/1986 | Bernardi . |
| 4,608,917 | 9/1986 | Faaborg . |
| 4,628,897 | 12/1986 | Stanfa et al. ............... 126/41 R |
| 4,727,853 | 3/1988 | Stephen et al. . |
| 4,777,927 | 10/1988 | Stephen et al. ............ 126/25 R |
| 4,819,614 | 4/1989 | Hitch . |
| 4,966,125 | 10/1990 | Stephen et al. ............... 99/342 |
| 5,031,602 | 7/1991 | Vick .............................. 99/339 |
| 5,065,734 | 11/1991 | Elliott ............................ 126/9 R |
| 5,070,857 | 12/1991 | Sarten ......................... 126/25 A |
| 5,167,183 | 12/1992 | Scholosser et al. . |
| 5,168,796 | 12/1992 | Porton et al. . |
| 5,197,379 | 3/1993 | Leonard, Jr. .................. 99/446 |
| 5,211,105 | 5/1993 | Liu . |
| 5,226,405 | 7/1993 | Snow . |
| 5,237,914 | 8/1993 | Carstensen . |
| 5,247,978 | 9/1993 | Zuran . |
| 5,259,299 | 11/1993 | Ferraro ......................... 99/340 |
| 5,277,106 | 1/1994 | Raymer et al. . |
| 5,279,277 | 1/1994 | Barker . |

OTHER PUBLICATIONS

Catalogue Sheet #9194, Nature's Own, 453 S. Main St., Attleboro, Mass. "Flavor Grid System", date unknown.
Catalogue Sheet No. FM194, Robert H. Peterson Co., 530 Baldwin Park Blvd., City of Industry, Calif., date unknown.

*Primary Examiner*—Timothy F. Simone
*Attorney, Agent, or Firm*—Martin P. Hoffman; Mitchell B. Wasson; Stewart L. Gitler

[57] ABSTRACT

A rack and screen assembly for converting gas grilles into charcoal and/or wood burning stations. The assembly is fabricated from high temperature stainless steel, so that the assembly, when heated to its cooking temperature, retains such elevated temperature for an extended period of time. The rack includes an open frame with runner legs at its lower end, that sit atop the cylindrical tubes of conventional gas grilles. Braces extend transversely across the open frame to reinforce same, and ledges are defined at the upper ends of the open frame. The perforated metal screen is inserted into the upper end of the frame until the screen rests upon the ledges. When the screen is damaged, or wears out, the damaged screen is lifted out of the frame and replaced, manually, in a simple fashion and without resort to manual tools.

6 Claims, 2 Drawing Sheets

RACK AND SCREEN ASSEMBLY FOR CONVERTING GAS GRILLES INTO CHARCOAL AND/OR WOOD BURNING GRILLES

FIELD OF THE INVENTION

The instant invention pertains generally to a rack and screen assembly for converting gas grilles into charcoal and/or wood burning grilles. More particularly, the invention relates to removable and replaceable screens employed with sturdy racks that function satisfactorily, at elevated temperatures, for extended periods of time.

BACKGROUND OF THE INVENTION

Restaurants, and cafeterias, and similar food establishments, usually utilize gas grilles for cooking large quantities of food. The gas grilles use elongated, cylindrical gas tubes to cook the food to be served. Such arrangement, while efficient for most purposes, is relatively inflexible, and does not readily lend itself to re-configuration for wood/charcoal barbecuing, or smoking, foods to be served.

Diverse attempts have been made to convert selected portions of the commercially used gas grilles into barbecuing and/or smoking stations, so that the same restaurant could easily prepare broiled, fried, boiled foods, etc., as well as barbecued and smoked foods. Furthermore, the nature and texture of the barbecued and smoked foods could be further varied, and enhanced, by the utilization of flavored wood chips, so that the aroma of mesquite and other woods could be imparted to the food being prepared.

One attempt has relied upon the introduction of "lava rocks" into the bed of the gas grilled in proximity to the cylindrical tubes. The "lava rocks" do not produce any heat. "Lava rocks" or radiant bars merely act as heat diffusers, and do not operate either as a heat booster or as a flavoring agent, which characteristics are desired by commercial food establishments.

Another approach has relied upon the introduction of charcoal briquettes at selected locations in the bed of the gas grilles. However, the charcoal briquettes have clogged the apertures in the cylindrical tubes, the ash residue is unsightly, and this approach has proven to be unsatisfactory.

A more successful approach, for home use only, has been implemented in the past few years by the Robert H. Peterson Company, situated in City of Industry, Calif. Such company has produced, and sold, a metallic, one piece grid under the trademark "Flavor Grid." Such grid 10, as shown in FIG. 1 of the instant application, comprises a first runner leg 12 and a second runner leg 14, a first transverse brace 16 and a second transverse brace 18, with a steel grid 20 secured thereto.

The grid 20 includes a first outwardly sloping sidewall 22, a first longitudinally extending valley 24, a central horizontal cooking surface 26, a second longitudinally extending valley 28, and a second outwardly sloping sidewall 30. A first end wall 32 with a forwardly projecting lip 34 is located at one end of grid 20, while a second end wall 36 with a rearwardly projecting lips 38 is located at the opposite end of grid 20.

The grid is fabricated from a heavy duty steel, such as cast iron, with a porcelainized finish. Valleys 24, 28 fit into complementary notches in braces 16 and 18, and are secured thereto, by spot welding or other fastening methods. Supports (not shown in FIG. 1) may also join grid 20 to runner legs 12 and 14 at mid-span of the grid.

In operation, runner legs 12 and 14, which are triangular when viewed in end elevation, are positioned on the cylindrical gas tubes of the gas grille. The gas jets are turned on "high", and the grid is heated to its own fuel combustion temperature in 5–10 minutes. The grid, because of its metal body, retains sufficient heat to perform grilling operations, as needed, for extended periods of time. Wood chips are then added to the grid to thereby gas grill the food with wood flavor. The food to be grilled is placed on planar cooking surface 36.

The aforedescribed metal grid has functioned satisfactorily in the home grille market, but has gained virtually no acceptance in the restaurant industry, due to frequent burn-out. The food cooked thereon has been tasty, the grid obviates the need for "lava racks", and the grid is compatible with existing gas grilles for the home market. Also, the grid is economical to operate, since the temperature of the gas grille may be lowered significantly, once the grid has reached its operating temperature.

Nonetheless, certain limitations have been observed with the aforedescribed metal grid. To illustrate, the grid 20 is fabricated from cast iron, and frequently fails by warping or burning out after repeated heating and cooling usage, at temperatures as low as 800° F. Since the grid is secured at numerous points to the runner legs, the entire assembly must be discarded. Also, the grid is heated up to its operating temperature rather slowly, and the time delay has precluded its acceptance by commercial food establishments.

SUMMARY OF THE INVENTION

With the shortcomings of known techniques and equipment for converting either commercial or home gas grilles into barbecuing and/or smoking stations, the instant invention contemplates a rack and screen assembly of unique design. Such rack and screen assembly is fabricated from special high temperature stainless steel. The assembly comprises a (1) sturdy rack, and (2) a screen that is capable of withstanding repeated, and lengthy, exposure to temperatures as high as 1800° F., without failure.

Furthermore, the screen, when and if warped, or otherwise damaged, is readily removed from the rack for supporting same. A new screen is positioned within the rack, and the assembly is ready for continued use, with minimum "down time" or maintenance.

The novel rack comprises a rectangular frame with a pair of runner legs extending along the length of the frame; the runners are welded or otherwise joined to the front and rear wall of the frame. Cylindrical supports extend along the opposite, parallel sidewalls, and spaced braces extend transversely across the upper surfaces of the runner legs. The screen fits snugly within the open upper end of the frame, and the frame rests upon the cylindrical supports and the braces.

The screen maintains its structural integrity and grid configuration for extended periods of time. The screen will thus be available for use in grilling or smoking operations, and will stimulate the willingness of commercial food establishments to expand their menus in this regard.

Moreover, the instant rack and screen assembly impart several cooking benefits to any gas grille, that can not otherwise be achieved on the same gas grille. To illustrate, the instant rack and screen assembly heats up very quickly, in 5–7 minutes, due to its stainless steel composition. The stainless steel retains the heat imparted thereto, and significant fuel savings, in the range of 30%–50%, are achieved.

Also, the time needed for the rack and screen assembly to reach cooking temperature is approximately 5–7 minutes, while gas grilles relying upon "lava rocks", or radiant bars, typically require 20–30 minutes to reach cooking temperature.

The instant rack and screen assembly can burn ultra high-carbon chip charwood fuel, which boosts the cooking temperature by 150°–200° F. Consequently, the food is cooked at an accelerated rate, and the out-put of the grill is increased, with attendant profit gain for the commercial food establishment.

Furthermore, since the instant rack and screen assembly retain heat imparted thereto from the gas grille, only small amount of wood chips and charcoal chips are used as heat boosters and flavoring agents, and emissions are reduced accordingly.

The instant rack and screen assembly creates moister food products, due to the boost in cooking temperature imparted by the fuel burned thereon. The increased temperature causes a "dry" heat which sears the food while reducing the exterior moisture coating on the food product. The exterior moisture coating is undesirable, for it holds open the pores of the food being cooked, and dissipates the natural food juices, leading to dehydrated, less flavorful foods.

The addition of small, controlled quantities of wood chips and/or chip charwood charcoal, to the instant rack and screen assembly, imparts unique wood or charcoal flavors to the food that could not be achieved by a gas grille, standing alone.

Yet other advantages stemming from the instant rack and screen assembly will become evident from the appended drawings when construed in harmony with the ensuing description of a preferred embodiment of the present invention.

DESCRIPTION OF THE PREFERRED EMBODIMENT

Figure 1:
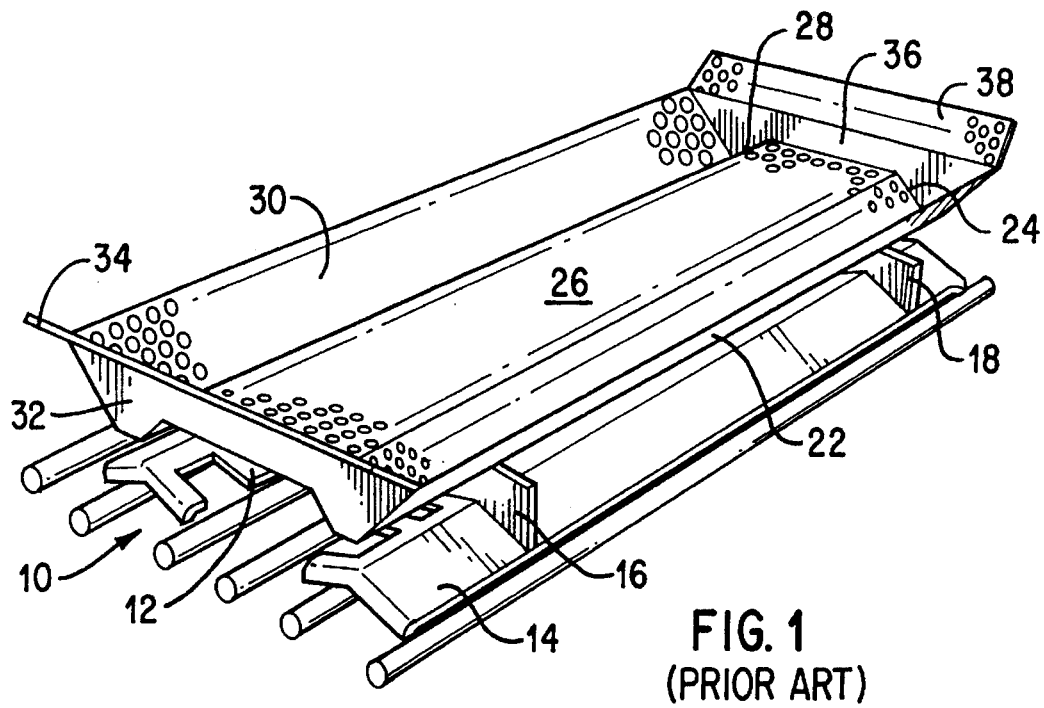
FIG. 1 is a perspective view of a known metal grid resting upon the cylindrical gas tubes of a conventional gas grille; such view is identified by the legend "Prior Art"

As noted and discussed in the Background of the Invention, FIG. 1 depicts a conventional metal grille 10, manufactured and sold by the Robert H. Peterson Company. Grille 10 has been described in detail, and such description need not be repeated at this juncture. The legend "PRIOR ART" is set forth in Fig. to emphasize such fact.

Figure 2:
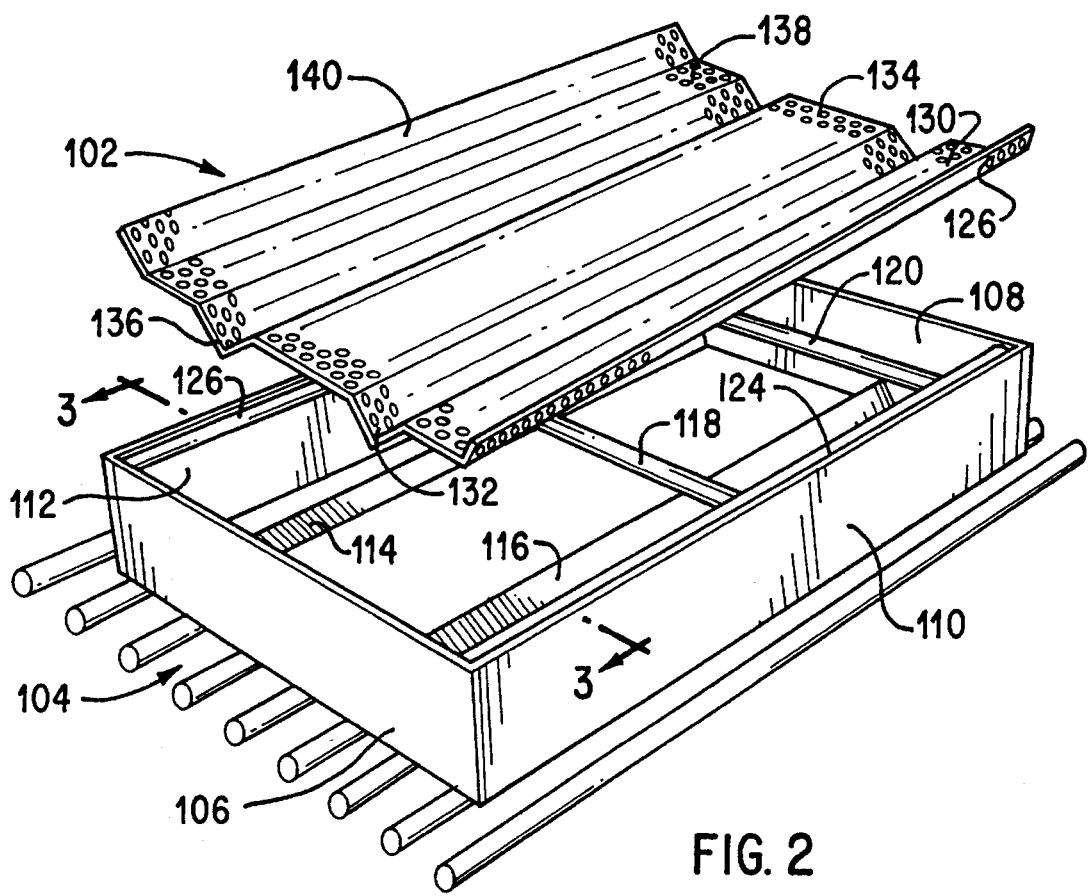
FIG. 2 is an exploded perspective view of a rack and screen assembly constructed in accordance with the principles of the instant invention.
Figure 3:
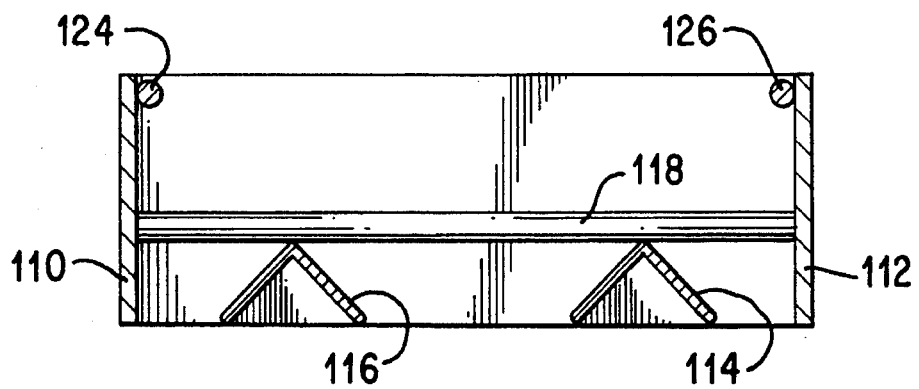
FIG. 3 is a vertical cross-sectional view of the rack of FIG. 2, such view being take along line 3—3 in FIG. 2 and in the direction indicated.
Figure 4:
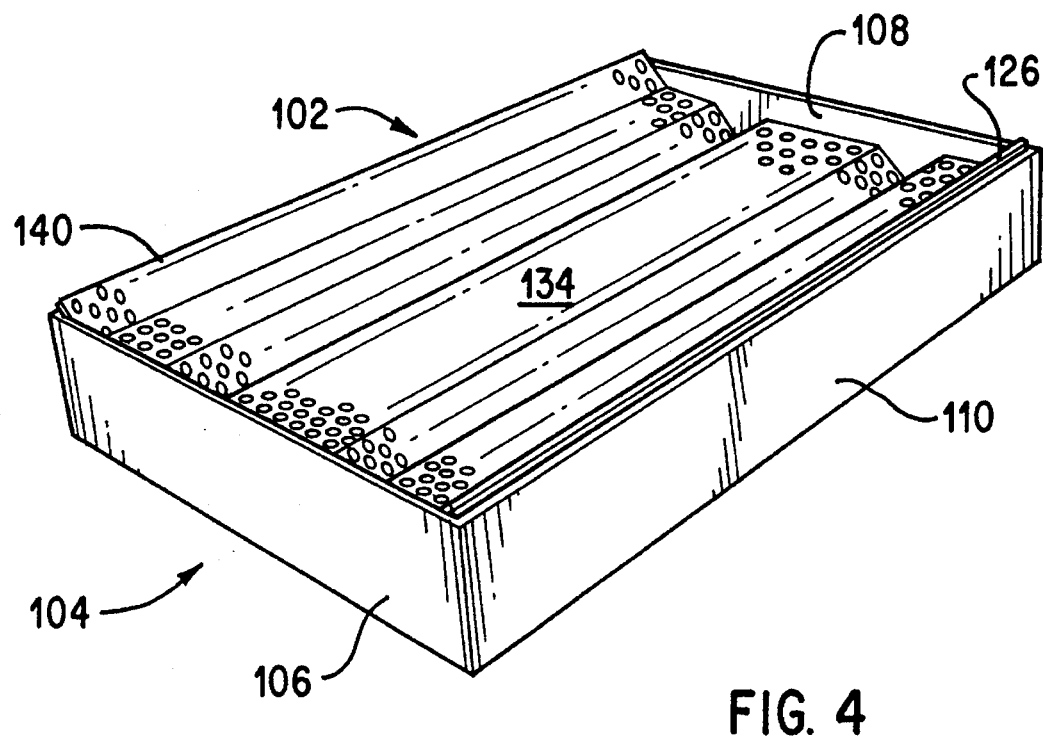
FIG. 4 is a perspective view of a rack and screen assembly of FIG. 2 with the screen seated within the rack.

FIGS. 2–4 depict the new, and improved, assembly 100 constructed in accordance with the principles of the instant invention. When completed, assembly 100 is ready to be placed directly on the cylindrical gas tubes in known food cooking systems for commercial establishments.

Assembly 100 comprises two major components, as shown in FIGS. 2 and 3. The major components are a screen, indicated generally by reference numeral 102, and a rack, indicated generally by reference numeral 104.

Rack 104 assumes the form of an upwardly opening, rectangular frame defined by a first end wall 106, a second end wall 108, a first side wall 110, and a second side wall 112. A first runner leg 114, and a second runner leg 116, extend between the end walls. The legs 114, 116 are triangular in end elevation, as shown in FIG. 3, to rest firmly upon cylindrical gas pipes in commercial food establishments.

A first brace 118 extends transversely across the rack 104, and is secured at its opposite ends to side walls 110, 112. A second brace 120 extends transversely across rack 104 adjacent to end wall 108, while a third brace 122, shown in FIG. 3, extends transversely across rack 104 adjacent to end wall 106. The braces are parallel to each other, and may be welded, or otherwise secured, to the apices of runner legs 114, 116 for additional strength.

A first ledge 124 extends along side wall 110, and a second, parallel ledge 126 extends along side wall 112. The ledges support the sides of screen 102, when the screen is inserted into the upper, open end of frames 104, as shown in FIG. 4.

Screen 102 is fabricated from stainless steel, which functions satisfactorily at much higher temperatures, and possesses a much longer life than cast-iron screens used on known metal grids. Screen 102 comprises a first outwardly tapering side wall 128, a first planar surface 130, a first valley 132, an enlarged central cooking surface 134, a second valley 136, a second planar surface 138, and a second outwardly tapering side wall 140. The screen is perforated throughout.

When screen 102 is inserted into rack 104, side walls 126, 140 on the screen rest upon ledges 124, 126. The apices of valleys 132, 134, rest upon braces 118, 120, and 122. When the screen is in need of repair or replacement, it is lifted out of rack 102 and replaced quickly and easily. The size of the perforations in screen 102 correlated with the size of charcoal and wood chip particles that may be poured onto the screen for barbecuing or smoking the food placed thereon.

The rack 104 is formed of heavy gauge stainless steel, and the internal braces resist warpage of the metal encountered with conventional metal grids. The rack may be used for extended periods of time, with several screens being replaced, before losing its structural rigidity and operational efficiency.

Other revisions, refinements, and modifications in the rack and screen assembly shown, and described above, may occur to the skilled artisan. To illustrate, while the rack and screen assembly is aimed at commercial food establishments, the same assembly could easily be modified for the home-owner with a backyard gas grille. Consequently, the appended claims should be broadly construed, in a manner consistent with the advances in the useful arts and sciences, realized by the instant invention.

I claim:

1. A rack and screen assembly for converting gas grilles into charcoal and/or woodburning stations, said assembly comprising:
   a) a rack including a first end wall, a second end wall, and a first side wall and a second side wall secured thereto to form an open frame,
   b) a first runner leg and a second runner leg secured between said first and second end walls, near the bottom of said frame,
   c) said runner legs adapted to fit on top of cylindrical pipes in a gas grille,
   d) a plurality of braces extending transversely across said open frame to reinforce same, e) a first ledge extending longitudinally along the upper end of said first side wall and a second ledge extending longitudinally along the upper end of said second side wall, and f) a perforated metal screen with a first side wall and a second side wall situated along opposite, longitudinally extending sides thereof, g) said screen being inserted into the upper end of said rack until said side walls on said screen rest upon said first and second ledges within the open frame.

2. The rack and screen assembly as defined in claim 1 wherein one of said braces is located at the midpoint of the first and second side walls of the frame.

3. The rack and screen assembly as defined in claim 2 wherein another of said braces is secured between said side walls proximate to one of said end walls.

4. The rack and screen assembly as defined in claim 1 wherein said braces are joined to the uppermost points of said first and second runner legs to strengthen the frame.

5. The rack and screen assembly as defined in claim 1 wherein said rack and said screen are formed of stainless steel and are capable of maintaining structural integrity when exposed to temperatures of 1800° F.

6. The rack and screen assembly as defined in claim 5 wherein said screen includes a first, outwardly tapering side wall, a central, planar surface, and a second, outwardly tapering side wall, said tapering side walls contacting said ledges within said frame, so that said screen is properly seated within said frame and rests upon said braces.

* * * * *